(12) United States Patent
Park et al.

(10) Patent No.: US 8,868,947 B2
(45) Date of Patent: *Oct. 21, 2014

(54) FAN CONTROL FOR DETERMINING A FAN SPEED THAT IS CLOSER TO AN OPTIMAL FAN SPEED BASED ON AN AMOUNT OF MEASURED CHANGE IN SYSTEM POWER CONSUMPTION AND TEMPERATURE OF A PROCESSOR

(75) Inventors: Hee-jun Park, Portland, OR (US); John Wallace, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/431,628

(22) Filed: Mar. 27, 2012

(65) Prior Publication Data

US 2012/0185711 A1 Jul. 19, 2012

Related U.S. Application Data

(63) Continuation of application No. 12/242,883, filed on Sep. 30, 2008, now Pat. No. 8,145,926.

(51) Int. Cl.
*G06F 1/26* (2006.01)
*G06F 1/32* (2006.01)
*G06F 1/20* (2006.01)

(52) U.S. Cl.
CPC ............. *G06F 1/206* (2013.01); *Y02B 60/1275* (2013.01); *G06F 1/203* (2013.01)
USPC .......................................... 713/320; 713/324

(58) Field of Classification Search
USPC .......................................... 713/300, 320, 324
See application file for complete search history.

(56) References Cited

U.S. PATENT DOCUMENTS

| | | | |
|---|---|---|---|
| 6,134,667 A | 10/2000 | Suzuki et al. | |
| 6,349,385 B1 | 2/2002 | Kaminski et al. | |
| 7,401,644 B2 | 7/2008 | Ziarnik et al. | |
| 7,489,092 B1 | 2/2009 | Larky et al. | |
| 7,499,770 B2 * | 3/2009 | Sawada | 700/304 |
| 7,809,965 B2 * | 10/2010 | Ziarnik et al. | 713/300 |
| 7,882,369 B1 * | 2/2011 | Kelleher et al. | 713/300 |
| 7,890,219 B2 * | 2/2011 | Tuma | 700/300 |
| 8,145,926 B2 | 3/2012 | Park et al. | |
| 2002/0152406 A1 * | 10/2002 | Watts et al. | 713/300 |
| 2003/0120394 A1 * | 6/2003 | Ziarnik | 700/300 |
| 2003/0216882 A1 * | 11/2003 | Lai et al. | 702/132 |
| 2005/0005621 A1 * | 1/2005 | Jayadev | 62/230 |
| 2005/0030171 A1 * | 2/2005 | Liu et al. | 340/500 |

(Continued)

*Primary Examiner* — Thomas Lee
*Assistant Examiner* — Phil Nguyen
(74) *Attorney, Agent, or Firm* — John F. Travis

(57) ABSTRACT

In general, in one aspect, the disclosure describes running a cooling fan within a computer at low speed while the computer is in low temperature operations (e.g., idle). The operation of the cooling fan may reduce CPU temperature enough to decrease CPU leakage power, offsetting the power consumption of the fan, and possibly resulting in a net system power reduction. The benefit at the platform level increases further when considering the low efficiency of voltage regulation (VR) in this lower power regime, and potentially reductions in other components (e.g., graphics processor). The optimal fan speed is the speed at which the overall system power is reduced the most (e.g., CPU power savings is greater than fan power utilized). The optimal temperature may be determined dynamically during operation or may be determined in manufacturing and applied statically during operation.

16 Claims, 4 Drawing Sheets

(56) References Cited

U.S. PATENT DOCUMENTS

| | | |
|---|---|---|
| 2005/0049729 A1 | 3/2005 | Culbert et al. |
| 2005/0174737 A1 | 8/2005 | Meir |
| 2005/0178133 A1 | 8/2005 | Henry et al. |
| 2005/0210896 A1 | 9/2005 | Durant et al. |
| 2006/0054713 A1 | 3/2006 | Wang et al. |
| 2006/0095796 A1* | 5/2006 | Chotoku et al. ............. 713/300 |
| 2006/0228223 A1 | 10/2006 | Chen et al. |
| 2008/0296009 A1 | 12/2008 | Ziarnik et al. |
| 2010/0023787 A1* | 1/2010 | Ho et al. ....................... 713/320 |
| 2010/0114379 A1* | 5/2010 | Sato et al. ..................... 700/275 |

* cited by examiner $$P_{wall} = E_{ACbrick}^{-1} \cdot \left( E_{fanVR}^{-1} \cdot P_{fan} + E_{coreVR}^{-1} \cdot P_{core} + E_{etcVR}^{-1} \cdot P_{etc} \right)$$

$$P_{fan} = \frac{1}{c_3} \cdot \frac{3}{c_1^3} \cdot \left( \left( V_{core} \cdot I_{sb,ref\ of\ core\ N} \cdot \left[ \frac{e^{m \cdot (V_{core} - V_{core,ref}) + n \cdot (T_j - T_{j,ref})}}{T_j - T_{amb}} \right] \right)^3 - c_2 \right)$$

$$P_{CPU} = V_{core} \cdot I_{sb,ref\ of\ core\ N} \cdot \left[ e^{m \cdot (V_{core} - V_{core,ref}) + n \cdot (T_j - T_{j,ref})} \right]$$

FIG. 6

FAN CONTROL FOR DETERMINING A FAN SPEED THAT IS CLOSER TO AN OPTIMAL FAN SPEED BASED ON AN AMOUNT OF MEASURED CHANGE IN SYSTEM POWER CONSUMPTION AND TEMPERATURE OF A PROCESSOR

RELATED APPLICATION

The present application is related to and claims priority from U.S. patent application Ser. No. 12/242,883, filed on Sep. 30, 2008 (now U.S. Pat. No. 8,145,926 issued on Mar. 27, 2012), which is incorporated herein by reference for all purposes.

BACKGROUND

Fans may be utilized in computer systems to provide cooling. The fans are used to provide cooling to the central processing unit (CPU) and other processors that generate large amounts of heat. The fans are typically turned on when the temperate of the CPU exceeds some threshold temperature. The use of the fans can reduce the temperature of the CPU and accordingly the leakage current and power consumption. In order to conserve the power consumed by the fan, the fan is typically turned off when the CPU is below some temperature or when the system is receiving power from the battery (e.g., system is unplugged) and battery conservation is desired.

BRIEF DESCRIPTION OF THE DRAWINGS

The features and advantages of the various embodiments will become apparent from the following detailed description in which:

FIG. 6 illustrates an example algorithm that may be utilized to determine a target temperature and optimal fan speed based on system parameters, according to one embodiment.

DETAILED DESCRIPTION

Figure 1:
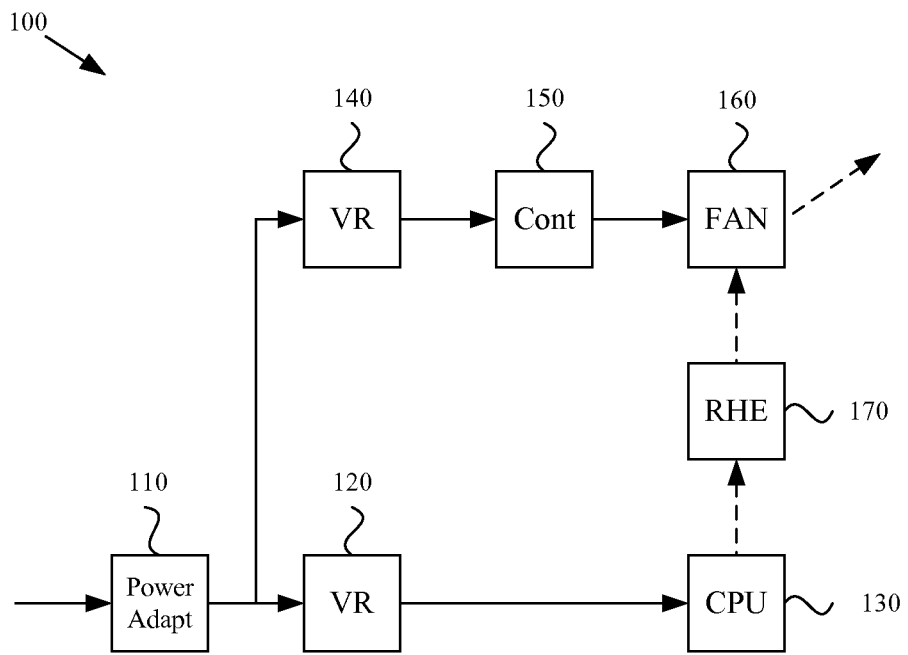
FIG. 1 illustrates a block diagram of an example computer system with cooling provided by a fan.

FIG. 1 illustrates a block diagram of an example computer system 100 with cooling provided by a fan. The computer 100 receives power from at a power adapter 110 that converts the AC power from a wall socket to DC power utilized by the computer 100. The power adapter 110 provides the power to a voltage regulator (VR) 120 to generate a regulated voltage for use by a central processing unit (CPU) 130. The power adapter 110 also provides the power to a VR 140 to generate a regulated voltage for use by a fan controller 150 and a fan 160. A remote heat exchanger (RCE) 170 is utilized to extract heat from the CPU 130 and provide it to a location where the fan 160 provides cooling thereto. A target temperature is the temperature at which the computer 100 is desired to operate. The target temperature may vary based on the operations of the computer 100.

As the target temperature increases, the fan will not be required to operate as much and the power consumed by the fan will be reduced. Alternatively, as the target temperature increases the CPU temperature increases and the leakage current increases resulting in the power consumed by the CPU being increased. The overall power consumed by the system 100 is based on the power consumed by the fan 160, the CPU 130, and other functions (not illustrated) as well as the efficiency of the VRs 120, 140, the fan controller 150 and other functions. The efficiencies of the VRs 120, 140 may vary based, for example, on the operating power and temperature of the system 100.

Figure 2:
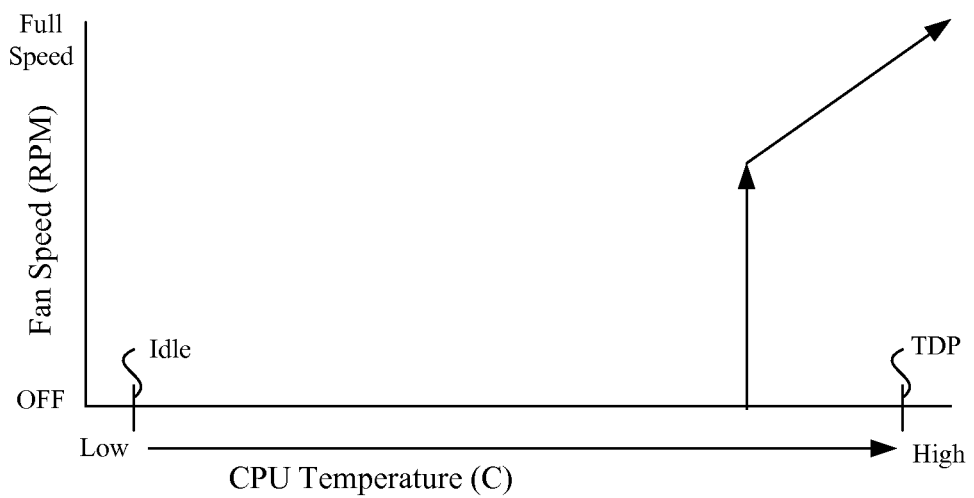
FIG. 2 illustrates a graph of an example implementation of the fan based on temperature of the CPU.

FIG. 2 illustrates a graph of an example implementation of the fan based on temperature of the CPU. Typically for low temperature operations, such as during CPU idle, the fan is not turned on in order to save the power required to operate the fan. Once the CPU gets into higher temperature operations associated with an operational CPU and approaches the thermal design power (TDP) of the CPU, the fan will turn on and the speed of the fan will increase with the temperature increase of the CPU.

During low temperature operations (e.g., idle) it is possible to reduce the power consumed by the CPU by cooling the CPU (reduce target temperature). The power consumed by the fan increases in order to reduce the target temperature. As the power of the CPU and the power of the fan are inversely related to one another the overall affect on the power of the system needs to be examined. In addition to reducing the temperature and power of the CPU, the operation of the fan may reduce the temperature and power of other components in the system (e.g., graphics processor). There may be a speed for which the fan may be operated that results in a maximum power savings during lower temperature operations (optimal speed for power savings).

Figure 3A:
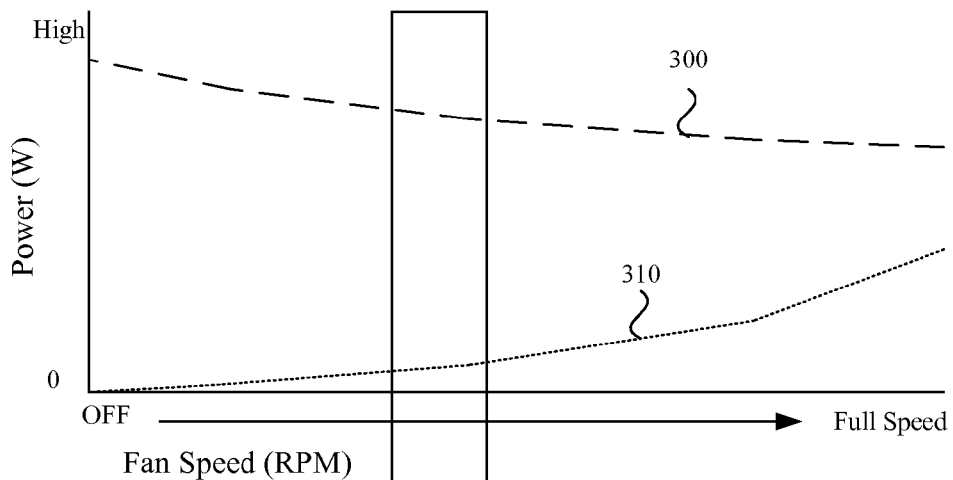
FIG. 3A illustrates a graph of example power consumptions of the CPU and fan for increasing fan speeds during low temperature operations, according to one embodiment.

FIG. 3A illustrates a graph of example power consumptions of the CPU 300 and fan 310 for increasing fan speeds during low temperature operations. As the fan speed increases the power consumed by the CPU 300 reduces as the temperature and leakage current are reduced. As the fan speed increases the power consumed by the fan 310 increases.

Figure 3B:
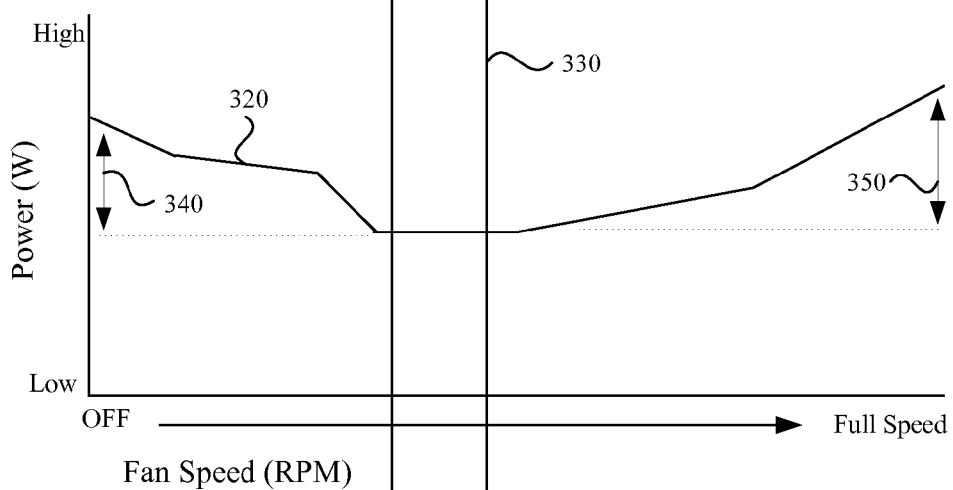
FIG. 3B illustrates a graph of an example overall system power consumption as the speed of the fan increases, according to one embodiment.

FIG. 3B illustrates a graph of an example overall system power consumption 320 as the speed of the fan increases. The overall power consumption 320 reduces as the fan is turned on and increases in speed. At this point, the power required to operate the fan is less than the power conserved by reducing the temperature of the CPU (as well as power possibly saved by reducing the temperature of other components). At a certain fan speed the overall power consumption 320 reaches a minimum (the optimal speed 330). As the fan speed continues to increase from the optimal speed, the overall power consumption 320 begins to increase again. At this point, the power required to increase the speed of the fan is more than the power savings provided by reducing the temperature of the CPU (and other components). A first power savings 340 may be achieved by turning the fan on and increasing the fan speed to the optimal speed 330 is achieved. A second power savings 350 may be achieved by reducing the fan from full speed to the optimal speed 330.

Figure 3C:
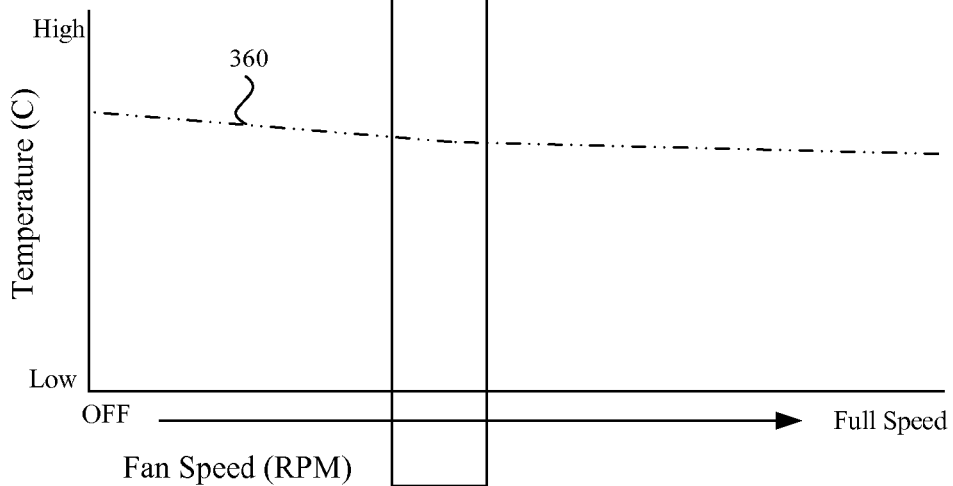
FIG. 3C illustrates a graph of an example overall system temperature as the speed of the fan increases, according to one embodiment.

FIG. 3C illustrates a graph of an example overall system temperature 360 as the speed of the fan increases. The overall system temperature 360 is reduced as the fan is turned on and the speed is increased. At some point, the overall temperature may level off or even increase if the power and heat required to run the fan exceeds the heat reduction in the CPU (and other components).

The control of the fan during low temperature operations may be controlled dynamically or statically. For dynamic control the system may make decisions about increasing or decreasing the fan speed based on measurements made during operation of the system. For example, the system may take measurements regarding the power consumed by the fan and CPU during operation. The system may also take measurements regarding the power consumed by other components (e.g., graphics processor). The fan, CPU and other components may require the addition of one or more sense resisters to measure power if not already provided.

Rather than measuring CPU power, the CPU may measure the temperature and use existing leakage current characteristics to determine the leakage current (and power) based thereon. The other components (e.g., graphics processor) may also calculate power consumption in a similar way. Alternatively, the system may utilize operating system (OS) estimates of platform power utilized for battery life projection to estimate the power consumption.

Regardless of how the power consumption is measured or calculated, the system may calculate the overall power of the system for a certain fan speed (e.g., measure prior to initiation of the fan). The fan speed may then be adjusted and the overall system power may be calculated again. If the overall system power was reduced the fan speed was adjusted in the correct direction while if the overall power increased the fan speed was either adjusted in the wrong direction or the previous value may be the optimal value.

Figure 4:
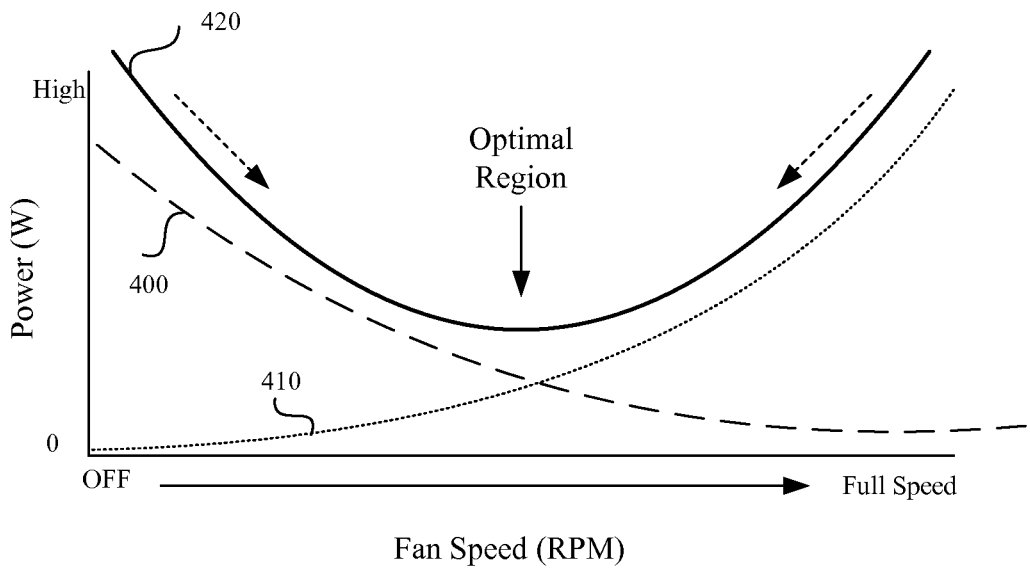
FIG. 4 illustrates a graph of a dynamic implementation of adjusting fan speed to select an optimal speed for power conservation for low temperature (low power) operations, according to one embodiment.

FIG. 4 illustrates a graph of a dynamic implementation of adjusting fan speed to select an optimal speed for power conservation. The CPU power 400 and the fan power 410 are measured/determined for an initial fan speed (e.g., off). A determination is made as to the overall system power 420. As illustrated, the overall system power 420 is simply based on CPU power 400 and fan power 410. The overall system power may also take into account the power of other components (e.g., graphics processor) that may be affected by cooling.

The fan speed is then adjusted (e.g., to a faster speed) and the CPU power 400 and fan power 410 are measured/determined again and the system power 420 is determined. The measurement/determination of CPU power 400 and fan power 410 may be made after the fan has been running at the new speed for some period (e.g., time, cycles). If the change in system power 420 was negative meaning that the overall system power 420 was reduced the fan speed was adjusted correctly. For example, as the fan speed is initially increased the system power 420 will be reduced (left side of system power 420 curve). The fan will be incremented in the same direction as long as a determination is made that the system power 420 is being reduced.

When the system power 420 increases the fan speed was adjusted too much in the particular direction (e.g., for fan speed increase the fan power 410 required to operate the fan at the additional speed is more than savings in CPU power 400 at the lower temperature). The fan speed is adjusted in the opposite direction and the system power 420 is determined again. Eventually, an optimal fan speed will be determined that provides the lowest system power 420 (e.g., lowest point on system power curve, point on system power curve where slope equals 0).

It is possible that the measurements result in the fan speed oscillating back and forth between two speeds. The optimal fan speed may be selected from one of those speeds or the system may allow the fan speed may oscillate back and forth. If the optimal fan speed is selected the fan may continue to operate at that speed. The system may at times adjust the fan speed from the selected optimal speed to determine if the fan speed is still optimal. The adjustment to the optimal fan speed may be done at defined periods (e.g., time, cycles) or may be based on some system parameters (e.g., change in system status, change in system temperature).

The adjustments to the fan speed may be same for each adjustment period or may vary based on conditions. For example, the fan speed may be implemented in certain increments while the system power is decreasing, and then the increments may be reduced each time a determination is made that the system power increased.

Figure 5:
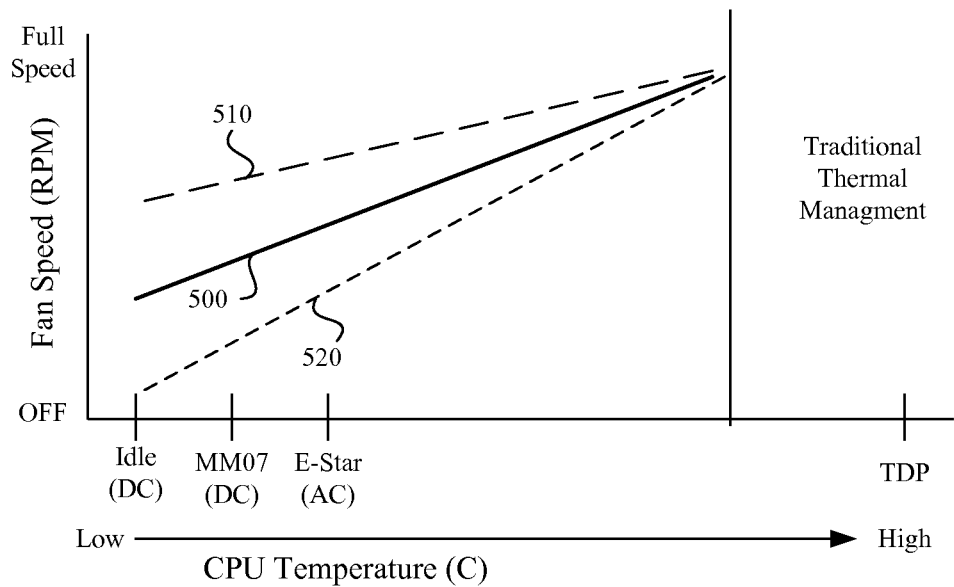
FIG. 5 illustrates a graph illustrating an example static implementation of optimal fan speed over CPU temperature for low temperature (low power) operations, according to one embodiment.

FIG. 5 illustrates a graph illustrating an example static implementation of optimal fan speed 500 over CPU temperature for low temperature (low power) operations. The optimal fan speed 500 may be calculated by an engineer at the time the computer is designed or may be calculated by an algorithm used to calculate optimal fan speed based on system parameters. The optimal fan speed may be a parameter defined in the fan controller, and the fan may operate at the defined speed based on the temperature of the CPU.

As the optimal fan speed 500 is determined during the design of the system the optimal fan speed may not equate to what would be optimal in operation due to, for example, manufacturing or operational differences. For example, if the dynamic method of defining the optimal fan speed was utilized it may determine an optimal fan speed 510 that is above the static optimal fan speed 500. Accordingly, the system power savings may not be as much as it could have been if the fan speed was increased (e.g., on left side of FIG. 4). If the dynamic method determined that an optimal fan speed 520 below the static optimal fan speed 500. In this case, the system power savings may not be as much as it could have been had the fan speed been reduced (e.g., on right side of FIG. 4). Whether the static optimal fan speed 500 is optimal in operation or not, use of the static optimal fan speed 500 provides system power savings that would not be available if the fan was not run during low temperature (low power) operations.

FIG. 5 includes some typical low power benchmarks (idle mode, mobile mark 2007 (MM07), and Energy Star) overlayed over the CPU temperature (the placement is relative as the CPU temperature for these benchmarks may vary based on different parameters. MM07 is a benchmark for limited CPU operations associated with conserving battery life in a portable computer and Energy Star is a benchmark for reducing energy. Utilizing the fan during these low power operations may reduce power consumed and conserve energy, and accordingly assist the systems meet these benchmarks.

FIG. 6 illustrates an example algorithm that may be utilized to determine a target temperature and optimal fan speed based on system parameters. The algorithm may be utilized for any system where the parameters are known and may not require excessive experimentation by the engineer.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment"

appearing in various places throughout the specification are not necessarily all referring to the same embodiment.

The various embodiments are intended to be protected broadly within the spirit and scope of the appended claims.

What is claimed:

1. A device comprising:
    logic to at least partially determine a substantially optimal speed for a fan, the fan to comprise at least a portion of a cooling solution for a processor in a computer system, wherein the logic is to:
    measure the computer system power consumption and a temperature of the processor while the fan is operating at a first fan speed
    change the speed of the fan to a second fan speed;
    measure the computer system power consumption and the temperature of the processor at a time after the speed of the fan has been changed to the second fan speed;
    determine whether the first fan speed or the second fan speed is closer to the substantially optimal speed for the fan based, at least in part, on an amount of measured change in the computer system power consumption and the temperature of the processor at the first fan speed and the second fan speed.

2. The device of claim 1, wherein the logic is further to:
    cause the fan to operate at the one of the first and second fan speeds determined to be closer to the substantially optimal speed for the fan.

3. The device of claim 2, wherein the logic is further to:
    determine whether the operated fan speed is substantially optimal; and
    if the operated fan speed is not substantially optimal, cause a measurement of the computer system power consumption and the temperature of the processor at one or more fan speeds different than the first and second fan speeds.

4. The device of claim 1, wherein the substantially optimal speed for the fan comprises a speed that causes the processor temperature to be at a defined maximum processor operating temperature.

5. A system comprising:
    a processor;
    a fan comprising at least a portion of the cooling solution for the processor; and
    logic to at least partially determine an substantially optimal speed for a fan, wherein the logic is to:
    measure the computer system power consumption and a temperature of the processor while the fan is operating at a first fan speed;
    change the speed of the fan to a second fan speed;
    measure the computer system power consumption and the temperature of the processor at a time after the speed of the fan has been changed to the second fan speed;
    determine whether the first fan speed or the second fan speed is closer to the substantially optimal speed for the fan based, at least in part, on an amount of measured change in the computer system power consumption and the temperature of the processor at the first fan speed and the second fan speed.

6. The system of claim 5, wherein the logic is further to:
    cause the fan to operate at the one of the first and second fan speeds determined to be closer to the substantially optimal speed for the fan.

7. The system of claim 6, wherein the logic is further to:
    determine whether the operated fan speed is substantially optimal; and
    if the operated fan speed is not substantially optimal, cause a measurement of the computer system power consumption and the temperature of the processor at one or more fan speeds different than the first and second fan speeds.

8. The system of claim 5, wherein the substantially optimal speed for the fan comprises a speed that causes the processor temperature to be at a defined maximum processor operating temperature.

9. A method comprising:
    measuring a computer system power consumption and a temperature of a processor in the computer system while a fan is operating at a first fan speed, the fan to comprise at least a portion of a cooling solution for the processor;
    changing the speed of the fan to a second fan speed;
    measuring the computer system power consumption and the temperature of the processor at a time after the speed of the fan has been changed to the second fan speed;
    determining whether the first fan speed or the second fan speed is closer to the substantially optimal speed for the fan based, at least in part, on an amount of measured change in the computer system power consumption and the temperature of the processor at the first fan speed and the second fan speed.

10. The method of claim 9, further comprising:
    causing the fan to operate at the one of the first and second fan speeds determined to be closer to the substantially optimal speed for the fan.

11. The method of claim 10, further comprising:
    determining whether the operated fan speed is substantially optimal; and
    if the operated fan speed is not substantially optimal, causing a measurement of the computer system power consumption and the temperature of the processor at one or more fan speeds different than the first and second fan speeds.

12. The method of claim 9, wherein the substantially optimal speed for the fan comprises a speed that causes the processor temperature to be at a defined maximum processor operating temperature.

13. A non-transient computer-readable medium to store instructions, the instructions, when executed by a computer, cause the computer to:
    measure a computer system power consumption and a temperature of a processor in the computer system while a fan is operating at a first fan speed, the fan to comprise at least a portion of a cooling solution for the processor:
    change the speed of the fan to a second fan speed;
    measure the computer system power consumption and the temperature of the processor at a time after the speed of the fan has been changed to the second fan speed;
    determine whether the first fan speed or the second fin speed is closer to the substantially optimal speed for the fan based, at least in part, on an amount of measured change in the computer system power consumption and the temperature of the processor at the first fan speed and the second fan speed.

14. The non-transient computer-readable medium of claim 13, to further cause the computer to:
    cause the fan to operate at the one of the first and second fan speeds determined to be closer to the substantially optimal speed for the fan.

15. The non-transient computer-readable medium of claim 14, to further cause the computer to:
    determine whether the operated fan speed is substantially optimal; and
    if the operated fan speed is not substantially optimal, cause a measurement of the computer system power consumption and the temperature of the processor at one or more fan speeds different than the first and second fan speeds.

16. The non-transient computer-readable medium of claim 13, wherein the substantially optimal speed for the fan comprises a speed that causes the processor temperature to be at a defined maximum processor operating temperature.

\* \* \* \* \*